United States Patent [19]
Matoushek

[11] Patent Number: 5,360,152
[45] Date of Patent: Nov. 1, 1994

[54] WEB GUIDANCE MECHANISM FOR AUTOMATICALLY CENTERING A WEB DURING MOVEMENT OF THE WEB ALONG A CURVED PATH

[75] Inventor: Robert J. Matoushek, Rochester, N.Y.

[73] Assignee: Eastman Kodak Company, Rochester, N.Y.

[21] Appl. No.: 81,724

[22] Filed: Jun. 23, 1993

Related U.S. Application Data

[63] Continuation-in-part of Ser. No. 838,976, Feb. 21, 1992, abandoned.

[51] Int. Cl.⁵ ............................................. B65H 23/02
[52] U.S. Cl. ................................... 226/199; 226/19
[58] Field of Search ................ 226/15, 18, 19, 3, 176, 226/197, 198, 199, 88, 97, 7; 242/76

[56] References Cited

U.S. PATENT DOCUMENTS

| | | | |
|---|---|---|---|
| 1,440,385 | 1/1923 | Foster | 193/1 |
| 3,001,680 | 9/1961 | Nitkiewicz | 226/199 X |
| 3,072,309 | 1/1963 | Hill | 226/88 |
| 3,119,534 | 1/1964 | Lehnert | 226/199 X |
| 3,261,525 | 7/1966 | De Lange | 226/199 |
| 3,371,770 | 3/1968 | Graham et al. | 226/186 X |
| 3,559,859 | 2/1971 | McArthur | 226/19 |
| 3,692,223 | 9/1972 | Laigle et al. | 226/199 |
| 3,927,814 | 12/1975 | Holm | 226/199 |
| 4,037,769 | 7/1977 | Meyers | 226/190 |
| 4,288,015 | 9/1981 | Curtin | 226/97 |
| 4,889,269 | 12/1989 | Long et al. | 226/97 |
| 4,925,077 | 5/1990 | Daane et al. | 226/97 |
| 5,114,063 | 5/1992 | Vukelich | 226/199 |

FOREIGN PATENT DOCUMENTS

| | | | |
|---|---|---|---|
| 2533769 | 2/1976 | Germany | 226/199 |

*Primary Examiner*—Daniel P. Stodola
*Attorney, Agent, or Firm*—Milton S. Sales

[57] ABSTRACT

A web guidance mechanism for automatically centering a web in a thermal printer has an elongated base member with first and second end portions each defining a slot. A crank is rotatably mounted on the base member and has slider arms attached thereto. Web guides are mounted on the distal end portions of the slider arms and are engageable with the slots for lateral movement. A coil spring biases the web guides towards one another to create two normally equal but opposite centering edge forces so that lateral movement of the web does not occur until twice the nominal edge force is applied to the web.

19 Claims, 5 Drawing Sheets

WEB GUIDANCE MECHANISM FOR AUTOMATICALLY CENTERING A WEB DURING MOVEMENT OF THE WEB ALONG A CURVED PATH

CROSS-REFERENCE TO RELATED APPLICATIONS

The present application is a continuation-in-part of co-pending U.S. patent application Ser. No. 07/838,976, filed Feb. 21, 1992, by Robert J. Matoushek, entitled "Web Guidance Mechanism", now abandoned.

TECHNICAL FIELD

This invention pertains generally to a thermal printer, and, more particularly, to a web guidance system for a thermal printer for laterally positioning the web.

BACKGROUND OF THE INVENTION

In a thermal printer, and other web transport systems, it is desirable to accurately position the web laterally in its plane. One such web center-guiding apparatus is disclosed in U.S. Pat. No. 4,889,269 and illustrated in prior art FIG. 8 wherein an air bar 1 supports and laterally center-guides a thin web 2 of material. The air bar 1 is mounted on a housing 3 via an end cap 4 and a bolt 5. The air bar 1 has a center ring 6 with apertures 7. Pressurized air travels through a passageway 8 in the housing 3 to the apertures 7 to hold the web 2 off the center ring 6 to provide a bearing surface. There are also guide apertures 9 for laterally center-guiding the web 2. U.S. Pat. No. 4,288,015 similarly discloses a contactless web turning guide which also uses apertures or air jets. In a work environment, such as a thermal printer, for example, operation of the apertures may be affected by dust or other debris thereby thwarting the center-guiding function.

The task of lateral positioning is often complicated by additional requirements such as using a common center line for various widths of webs each having some width tolerances. Another factor is maintaining the same path for several passes through the control portions of the system. U.S. Pat. No. 4,037,769 discloses a guide roller assembly that adjusts to accommodate different widths of material to maintain a common centerline. Unfortunately, the adjustment must be accomplished manually by turning knobs and screws. U.S. Pat. No. 3,261,525 discloses a tape guide which must also be adjusted manually to laterally center the tape about a drum. German Patent No. 2,533,769 discloses an adjusting device for a tire cord strip moving longitudinally in a reference plane. Two carriages are supported on a frame so that they can move in the transverse direction and are connected with a central device via a coupling element such that the two carriages can be moved simultaneously toward and from one another relative to the reference plane. Both carriages are permanently in contact with the edges of the strip for adjustment. While there is automatic adjustment, the apparatus is bulky with numerous parts for handling thick, heavy tire cord strips confined to a flat plane. Accordingly, it will be appreciated that it would be highly desirable to have a web guidance mechanism that is easy to manufacture, simple to install, and requires no manual adjustments for centering use with webs of various widths and width tolerances.

SUMMARY OF THE INVENTION

Briefly summarized, according to one aspect of the present invention, a web guidance mechanism for automatically centering a web comprises an elongated base member. The base member has first and second end portions each defining a slot. A crank is rotatably mounted on the base member and has slider arms attached thereto. Web guides are mounted on the distant end portions of the slider arms and are slot engageable with the slots for lateral movement towards and from each other. A biasing means biases the web guides towards one another to create two normally equal but opposite centering edge forces.

Any force applied by the web to either of the web guides to oppose either of the centering edge forces acts through the crank to oppose the other of the centering edge forces thereby increasing the magnitude of the force required to cause lateral movement of the web guides. Movement of the web guides allows the web to move laterally. Because the web guides are interlinked, a force roughly equal to both centering edge forces must be applied by the web to cause lateral movement.

The present invention provides an automatic web centering action without backlash regardless of web width within the design limits which are a function of the space limitations and the length of the slots. The automatic centering action is provided regardless of web widths, width variation, edge straightness or direction of travel. The two centering edge forces, applied at the web edges, are normally equal but opposite in direction if no external lateral force is applied to the web, but are interconnected in such a way that there is no lateral web movement until twice the nominal edge force is applied to the web. The tracking center line is easily adjusted with a simple jack screw arrangement and the nominal edge force can also be adjusted with a spring tensioning screw.

DETAILED DESCRIPTION OF THE PREFERRED EMBODIMENTS

Figure 1:
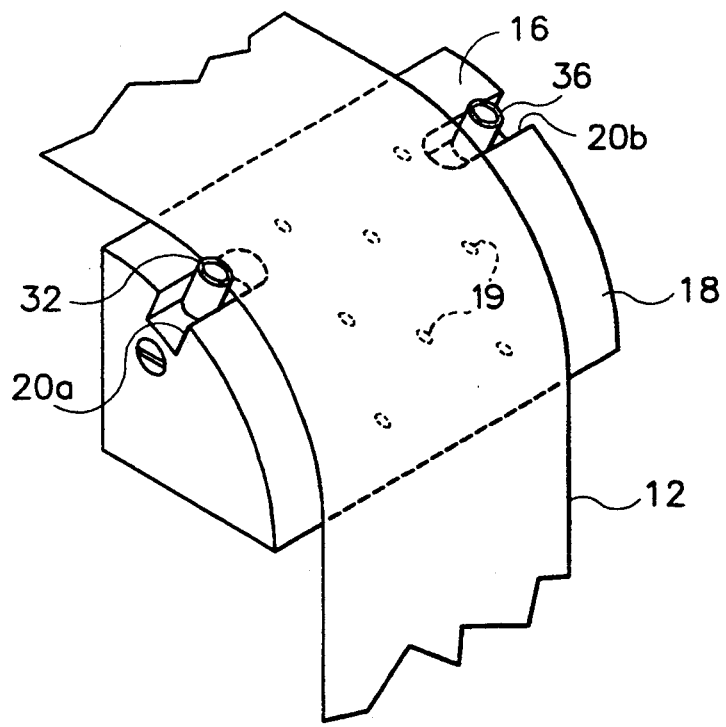
FIG. 1 is a diagrammatic perspective view of a preferred embodiment of a web guidance mechanism engaging a web as the web travels over an air shoe in accordance with the present invention.
Figure 2:
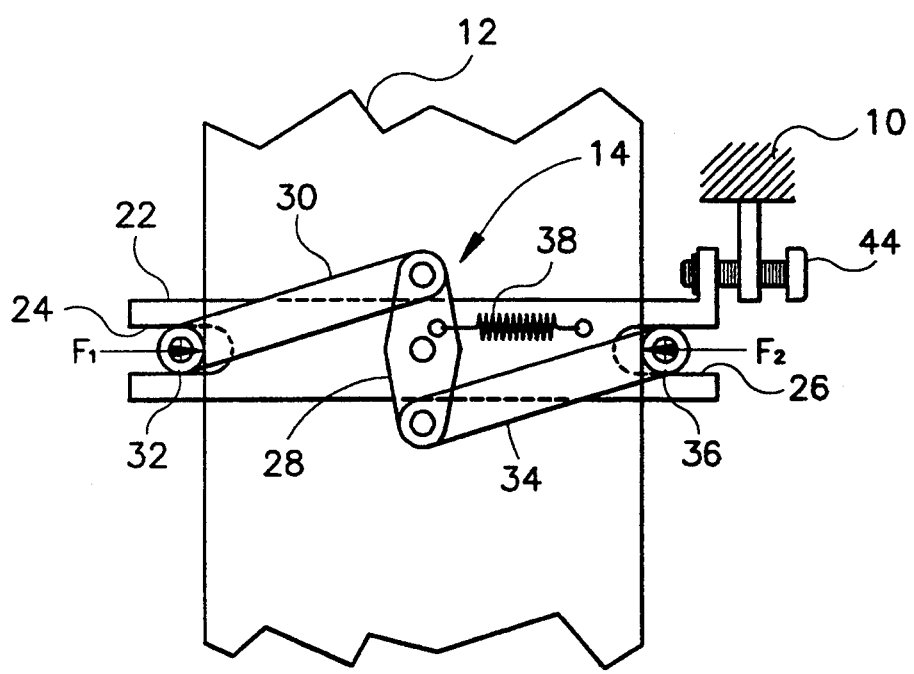
FIG. 2 is a simplified plan view of the web guidance mechanism and web of FIG. 1 without the air shoe.

Referring to FIGS. 1 and 2, a web handling apparatus, such as a thermal printer 10, has a web 12 of material therein, such as a dye donor web, for example. The thermal printer 10 is equipped with a web guidance mechanism 14 for automatically centering the web 12 laterally within the printer 10 on a drum or air shoe 16 over which the web 12 travels.

Figure 3:
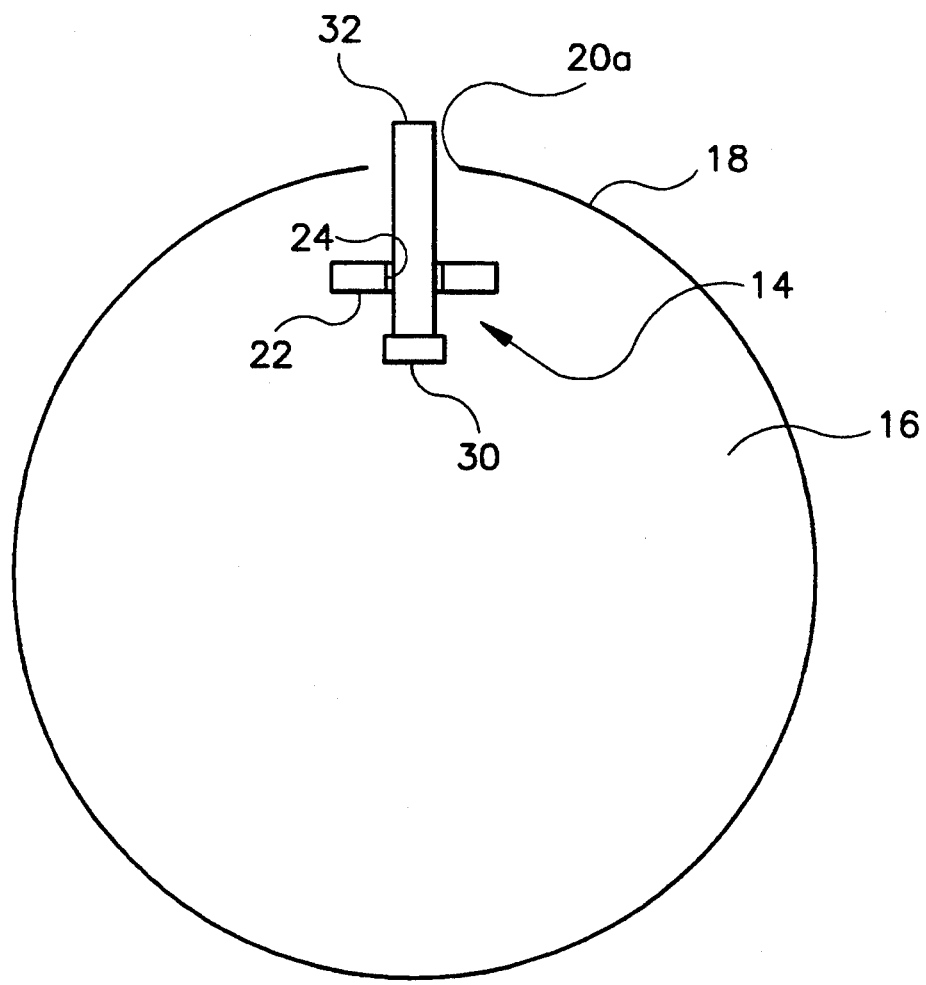
FIG. 3 is a diagrammatic end view showing the web guidance mechanism inside the air shoe.

Referring to FIGS. 1 and 3, the air shoe 16 has an arcuate, preferably cylindrical, outer surface 18 with slots 20a, 20b open to the interior of the air shoe 16. The interior is preferably hollow. The surface 18 is preferably perforated with multiple openings 19 to form a bearing or gliding surface for the web 12 that travels over the surface 18. The air shoe 16 changes the direction of travel of the web 12. As illustrated in FIG. 1, the direction of travel of the web 12 is altered by about 90 degrees as the web travels over the surface 18 of the air shoe 16.

Again referring to FIGS. 1 and 2, the web guidance mechanism 14 has an elongated base member 22 that has a first end portion defining a first slot 24 and a second end portion defining a second slot 26. A crank 28 is rotatably mounted on the base member 22. The crank 28 has a first end portion and a second end portion and is preferably mounted so that it rotates in a single plane.

Figure 6:
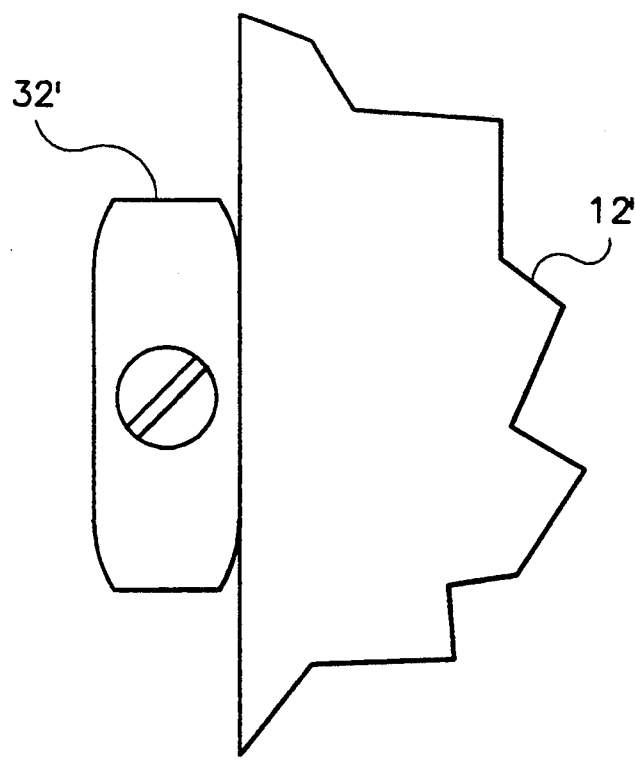
FIG. 6 is a simplified plan view illustrating contact of the web guidance mechanism with the edge of the web similar to FIG. 1, but illustrating another preferred embodiment
Figure 7:
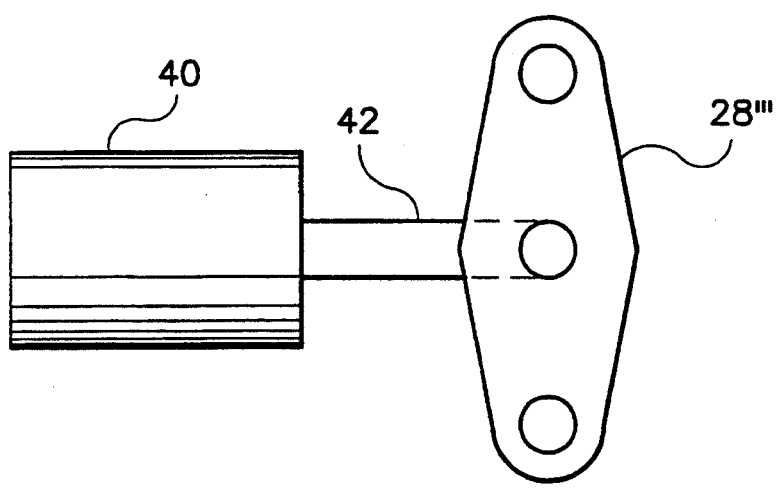
FIG. 7 is a diagrammatic view illustrating the crank of the web guidance mechanism driven by a motor.
Figure 8:
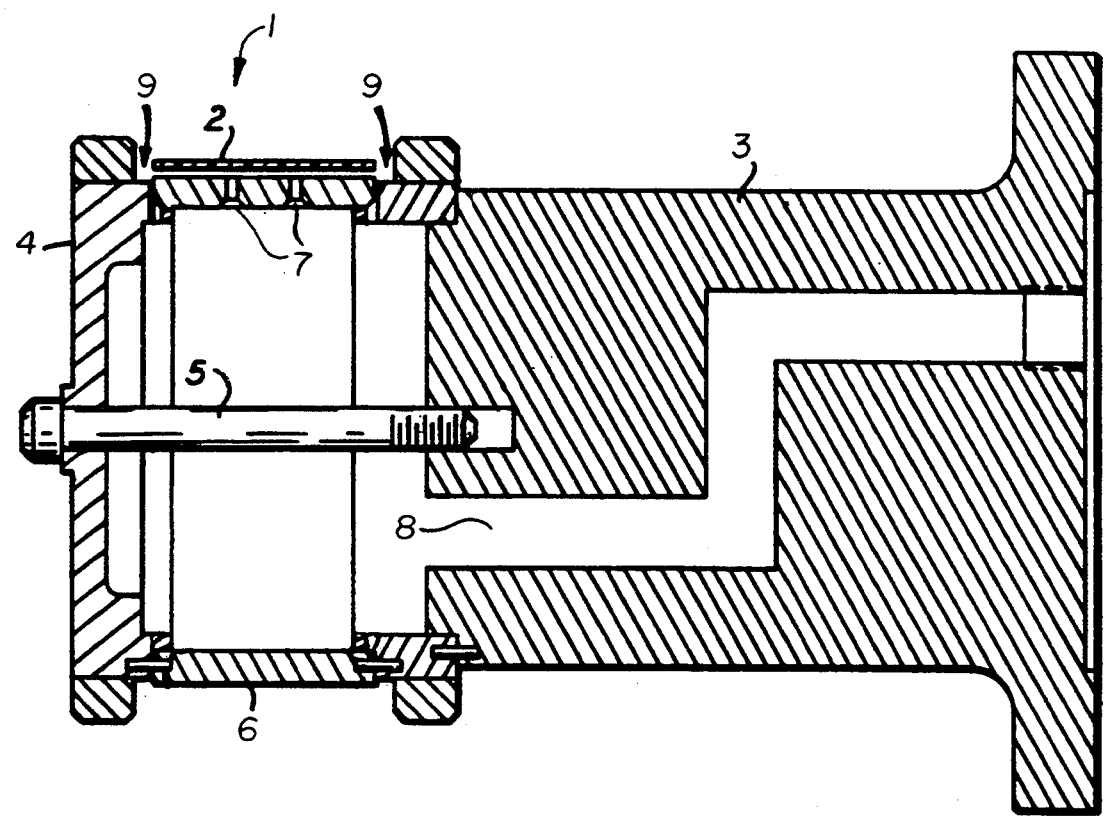
FIG. 8 is diagrammatic sectional view of an air-bearing center-guiding apparatus.

A first slider arm 30 has one end portion pivotally connected to the first end portion of the crank 28. A first web guide 32 is mounted on the distal end portion of the first slider arm 30 and is engageable with the first slot 24 of the first end portion of the base member 22. The web guide 32 has an outer surface that actually contacts the web 12 to guide the web 12. The contacting guide surface may be a cylindrical (FIG. 1) or a flat surface (FIG. 6). A flat surface offers the advantage of a larger area of contact with the web thereby allowing a larger force to be applied.

A second slider arm 34 has one end portion pivotally connected to the second end portion of the crank 28. A second web guide 36 is mounted on the distant end portion of the second slider arm 34 and is engageable with the second slot 26 of the second end portion of the base member 22. By this construction, a mechanism is formed such that movement of the first and second web guides 32, 36 is in concert with the web slider arms 30, 34 moving toward one another or away from one another in response to rotational movement of the crank 28. Because the crank 28 rotates in a single plane, there is no tendency for the web guide 32, 36 to ride out of the slots 24, 26, respectively.

A biasing means biases the first and second web guides 32, 36 toward one another to create two normally equal but opposite centering edge forces $F_1$, $F_2$ so that lateral movement of the web 12 does not occur until about twice the nominal edge force is applied to the web 12. The nominal edge force is the average magnitude of either of the centering edge forces $F_1$, $F_2$.

Referring to FIGS. 2, 4, 5 and 7, the biasing means may include a spring 38 or a motor 40 with shaft 42 used to act on the crank 28. The motor 40 turns the output shaft 42 to cause the shaft 42 to apply a torque to the crank 28 through a central pivotal portion, or any portion, of the crank 28. With a voltage controlled motor 40, the torque could be remotely monitored or controlled by varying the motor voltage. Alternatively, the crank 28 could be replaced by a motor 40 positioned to have the same rotational axis as the crank so that the sliders could be rotatably attached to the rotating portion of the motor. The motor could be an electric, pneumatic, hydraulic, or vacuum operated and could actuate the mechanism in several ways. One way is springless operation where the motor supplies the centering force which could be varied by a controlled change in power applied to the motor. The motor could reverse direction to open the guides for threading the web. A spring could be used with the motor to either apply the guide force or to open the guides when the motor is off.

The biasing spring is preferably a coil spring 38 that biases the first and second web guides 32, 36 toward one another to create the two normally equal but opposite centering edge forces $F_1$, $F_2$ so that lateral movement of the web 12 does not occur until about twice the nominal edge force is applied to the web 12. The coil spring 38 may have one end connected to the crank 28 at a point offset from the center of rotation of the crank 28, and have its other end attached to the base member 22 (FIG. 2).

Figure 4:
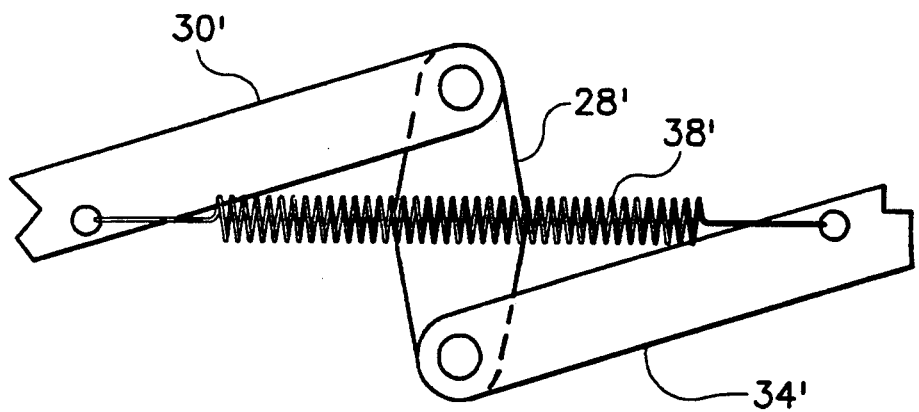
FIG. 4 is a simplified plan view of the web guidance mechanism similar to FIG. 2, but illustrating another preferred embodiment.
Figure 5:
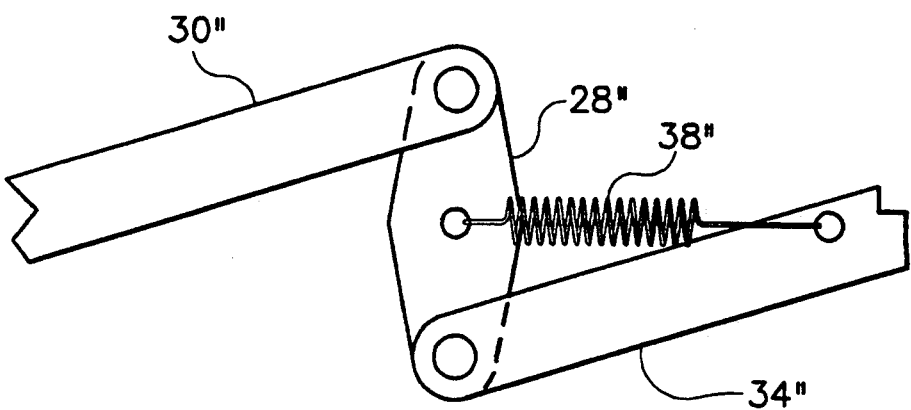
FIG. 5 is a plan view similar to FIG. 4, but illustrating another preferred embodiment.

Alternatively, the coil spring 38' may have one end attached to the first slider arm 30', and have the other end attached to the second slider arm 34' (FIG. 4). When the spring 38' is connected from one slider arm to the other, any backlash in the crank-slider joints is eliminated. Or, backlash in the crank-slider joints is also eliminated when the coil spring 38'' has one end attached to the first or second slider arm 30'' or 34'', and has the other end attached to a pivot pin or pivot point of the crank 28'' (FIG. 5).

An adjustment screw 44 may be used to vary the lateral position of the entire web guidance mechanism 14 relative to fixed points in the printer 10 or relative to the path of the web 12. An adjustment screw may be used with the coil spring to vary the tension and thereby vary the centering edge forces acting on the web 12.

Operation of the present invention is believed to be apparent from the foregoing description and drawings, but a few words will be added for emphasis. For a given width of web 12, the web guidance mechanism 14 is horizontally positioned using the adjustment screw 44. Preferably, the center line of the crank 28 is aligned with the center line of the web 12 as illustrated. The coil spring 38 has one end attached to the crank 28 and another end attached to the base member 22 for biasing the first and second web guides 32, 36 towards one another to create two normally equal but opposite centering edge forces $F_1$, $F_2$ so that lateral movement of the web does not occur until about twice the nominal edge force is applied to the web 12. Any force applied by the web 12 to either of the web guides 32, 36 to oppose either of the centering edge forces $F_1$, $F_2$ acts through the crank 28 to oppose the other of the centering edge forces thereby increasing the magnitude of the force required to cause lateral movement of the web guides 32, 36, and, consequently, lateral movement of the web 12.

It can now be appreciated that there has been presented a web guidance mechanism that basically consists of two web edge guides 32, 36 mounted on a slider crank mechanism and having a common crank and a common slider guide. The crank 28 is rotationally spring loaded by a coil spring 38 so that the edge guides provide a compression force on the web 12. The slider guide is suitably mounted to allow tracking set-up adjustments to be made by repositioning the slider guide laterally with respect to the web 12 by the use of jack screw 44. The edge force applied to the web 12 could also be adjusted by a tension adjuster on the spring 38. This mechanism would preferably be applied to a web on a very narrow curved support member which would provide beam strength to the web.

In thermal printers, and other Web transport systems, the web guidance mechanism accurately positions the web laterally in its plane. The mechanism eases the task of lateral positioning which may be complicated by requirements such as using a common center line for various widths of webs each having some width tolerances. The web guidance mechanism is easy to manufacture, simple to install, and requires no adjustments for use with webs of various widths and width tolerances.

The present invention provides an automatic web centering action without backlash regardless of web width within the design limits which are a function of the space limitations and the length of the slots. The automatic centering action is provided regardless of web widths, width variation, edge straightness or direction of travel. The two centering edge forces, applied at the web edges, are normally equal but opposite in direction if no external lateral force is applied to the web, but are interconnected in such a way that there is no lateral web movement until twice the nominal edge force is applied to the web. The tracking center line is easily adjusted with a simple jack screw arrangement and the nominal edge force can also be adjusted with a spring tensioning screw.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. For example, while the web guidance mechanism is illustrated aligned with the center line of the web, it is possible to have the longitudinal center line of the crank at other orientations relative to the web. It is also possible to have the slider arms of unequal lengths and the centering edge forces of unequal magnitudes as needed to position a web as desired.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A web guidance mechanism for automatically laterally centering a thin web traveling longitudinally in a direction, comprising:

a cylindrical member having a curved outer surface for changing the direction of travel of said web, said curved outer surface having a laterally extending slot;

an elongated base member having first and second slots and extending laterally inside said cylindrical member to a lateral position;

a crank having first and second end portions and being rotatably mounted on said base member;

a first slider arm having one end portion pivotally connected to said first end portion of said crank and having a distal end portion;

a first web guide mounted on said distal end portion of said first slider arm and engageable with said first slot of said base member and extending through said laterally extending slot of said curved outer surface of said cylindrical member;

a second slider arm having one end portion pivotally connected to said second end portion of said crank and having a distal end portion;

a second web guide mounted on said distal end portion of said second slider arm and engageable with said second slot of said base member and extending through said laterally extending slot of said curved outer surface of said cylindrical member; and biasing means for biasing said first and second web guides towards one another to create two normally equal but opposite centering edge forces.

2. A web guidance mechanism, as set forth in claim 1, wherein said biasing means includes a spring attached to said crank to rotationally bias said crank to urge said first and second web guides towards one another.

3. A web guidance mechanism, as set forth in claim 1, including means for changing the lateral position of said base member.

4. A web guidance mechanism, as set forth in claim 3, wherein said changing means includes a jack screw.

5. A web guidance mechanism, as set forth in claim 1, wherein said first web guide has a flat surface for contacting said web.

6. A web guidance mechanism, as set forth in claim 1, including an air shoe for changing the direction of travel of said web, said air shoe having a hollow interior portion and an arcuate outer surface with a slot, said base member being positioned in said interior portion with said first and second web guides extending through said shoe slot above said arcuate surface.

7. A web guidance mechanism, as set forth in claim 1, wherein said biasing means includes a motor having an output shaft connected to said crank.

8. A web guidance mechanism, as set forth in claim 1, wherein said biasing means includes a spring attached to said crank to rotationally bias said crank to urge said first and second web guides towards one another.

9. A web guidance mechanism, as set forth in claim 8, wherein said spring is a coil spring having one end attached to said first slider arm and the other end attached to a pivot point of said crank.

10. A web guidance mechanism, as set forth in claim 8, wherein said spring is a coil spring having one end attached to said first slider arm and the other end attached to said second slider arm.

11. A web guidance mechanism, as set forth in claim 8, wherein said spring is a coil spring having one end attached to said base member and the other end attached to said crank.

12. A web guidance mechanism for automatically laterally centering a thermal printing donor or receiver web traveling longitudinally in a direction, comprising:

a hollow member having a curved outer surface for changing the direction of travel of said web, said curved outer surface having a laterally extending slot;

an elongated base member having first and second slots and extending laterally inside said hollow member to a lateral position;

a crank having first and second end portions and being rotatably mounted on said base member;

a first slider arm having one end portion pivotally connected to said first end portion of said crank and having a distal end portion;

a first web guide mounted on said distal end portion of said first slider arm and engageable with said first slot of said base member and extending through said laterally extending slot of said curved outer surface of said hollow member;

a second slider arm having one end portion pivotally connected to said second end portion of said crank and having a distal end portion;

a second web guide mounted on said distal end portion of said second slider arm and engageable with said second slot of said base member and extending through said laterally extending slot of said curved outer surface of said hollow member; and biasing means for biasing said first and second web guides towards one another to create two normally equal but opposite centering edge forces so that lateral movement of said web does not occur until about twice the nominal edge force is applied to said web.

13. A web guidance mechanism, as set forth in claim 12, wherein said biasing means includes a spring attached to said crank to rotationally bias said crank to urge said first and second web guides towards one another.

14. A web guidance mechanism, as set forth in claim 13, wherein said spring is a coil spring having one end attached to said first slider arm and the other end attached to a pivot point of said crank.

15. A web guidance mechanism, as set forth in claim 13, wherein said spring is a coil spring having one end attached to said first slider arm and the other end attached to said second slider arm.

16. A web guidance mechanism, as set forth in claim 13, wherein said spring is a coil spring having one end attached to said base member and the other end attached to said crank.

17. A web guidance mechanism for automatically laterally centering a web traveling longitudinally in a direction in a thermal printer, comprising:

a hollow member having a curved outer surface for changing the direction of travel of said web, said curved outer surface having a laterally extending slot;

an elongated base member extending inside said hollow member and being connected to said thermal printer and having a first end portion defining a first slot and a second end portion defining a second slot;

a crank having a first end portion and a second end portion and being rotatably mounted on said base member;

a first slider arm having one end portion pivotally connected to said first end portion of said crank and having a distal end portion;

a first web guide mounted on said distal end portion of said first slider arm and engageable with said first slot of said first end portion of said base member and extending through said laterally extending slot of said curved outer surface of said hollow member;

a second slider arm having one end portion pivotally connected to said second end portion of said crank and having a distal end portion;

a second web guide mounted on said distal end portion of said second slider arm and engageable with said second slot of said second end portion of said base member and extending through said laterally extending slot of said curved outer surface of said hollow member; and a coil spring having one end attached to said crank and another end attached to said base member for biasing said first and second web guides towards one another to create two normally equal but opposite centering edge forces so that lateral movement of said web does not occur until about twice the nominal centering edge force is applied to said web.

18. A web guidance mechanism, as set forth in claim 17, wherein said first web guide has a flat surface for contacting said web.

19. A web guidance mechanism, as set forth in claim 17, including an air shoe for changing the direction of travel of said web, said air shoe having a hollow interior portion and an arcuate outer surface with a slot, said base member being positioned in said interior portion with said first and second web guides extending through said shoe slot above said arcuate surface.

* * * * *